(12) United States Patent
Kasuya et al.

(10) Patent No.: US 7,671,852 B2
(45) Date of Patent: Mar. 2, 2010

(54) DISPLAY DEVICE, DISPLAY METHOD, AND COMPUTER PRODUCT

(75) Inventors: Takayuki Kasuya, Tokyo (JP); Hiroshi Toriumi, Tokyo (JP); Naoko Ito, Tokyo (JP); Koji Suzuki, Tokyo (JP); Fumiko Kikuchi, Tokyo (JP); Akio Fukushima, Tokyo (JP)

(73) Assignee: Pioneer Corporation, Tokyo (JP)

( * ) Notice: Subject to any disclaimer, the term of this patent is extended or adjusted under 35 U.S.C. 154(b) by 919 days.

(21) Appl. No.: 11/443,444

(22) Filed: May 31, 2006

(65) Prior Publication Data

US 2007/0085844 A1      Apr. 19, 2007

(30) Foreign Application Priority Data

Oct. 17, 2005    (JP)    ............... 2005-302220

(51) Int. Cl.
*G06F 3/038*    (2006.01)
(52) U.S. Cl. ......................... 345/204; 345/76
(58) Field of Classification Search ....................... None
See application file for complete search history.

(56) References Cited

U.S. PATENT DOCUMENTS

| | | | |
|---|---|---|---|
| 4,338,598 A * | 7/1982 | Ohba et al. ................... | 345/76 |
| 6,356,031 B1 | 3/2002 | Thagard et al. | |
| 6,812,651 B2 * | 11/2004 | Iwata et al. ............... | 315/169.3 |
| 2004/0113903 A1 * | 6/2004 | Mikami et al. .............. | 345/204 |

FOREIGN PATENT DOCUMENTS

| | | |
|---|---|---|
| EP | 1 318 553 A2 | 6/2003 |
| JP | 2002-006769 A | 1/2002 |
| JP | 2002-008851 A | 1/2002 |
| JP | 2002-063801 A | 2/2002 |
| JP | 2003-264085 A | 9/2003 |
| JP | 2003-317970 A | 11/2003 |
| JP | 2004-361553 A | 12/2004 |

* cited by examiner

*Primary Examiner*—Alexander Eisen
*Assistant Examiner*—Robin Mishler
(74) *Attorney, Agent, or Firm*—Foley & Lardner LLP

(57) ABSTRACT

A display device includes a display unit, a state detecting unit, and a setting unit. The display unit includes a display screen on which an image is displayed. The state detecting unit detects a light emission state of a pixel of the display screen. The setting unit sets the pixel to any one of a display mode and a charge mode based on a result of detection by the state detecting unit.

14 Claims, 8 Drawing Sheets

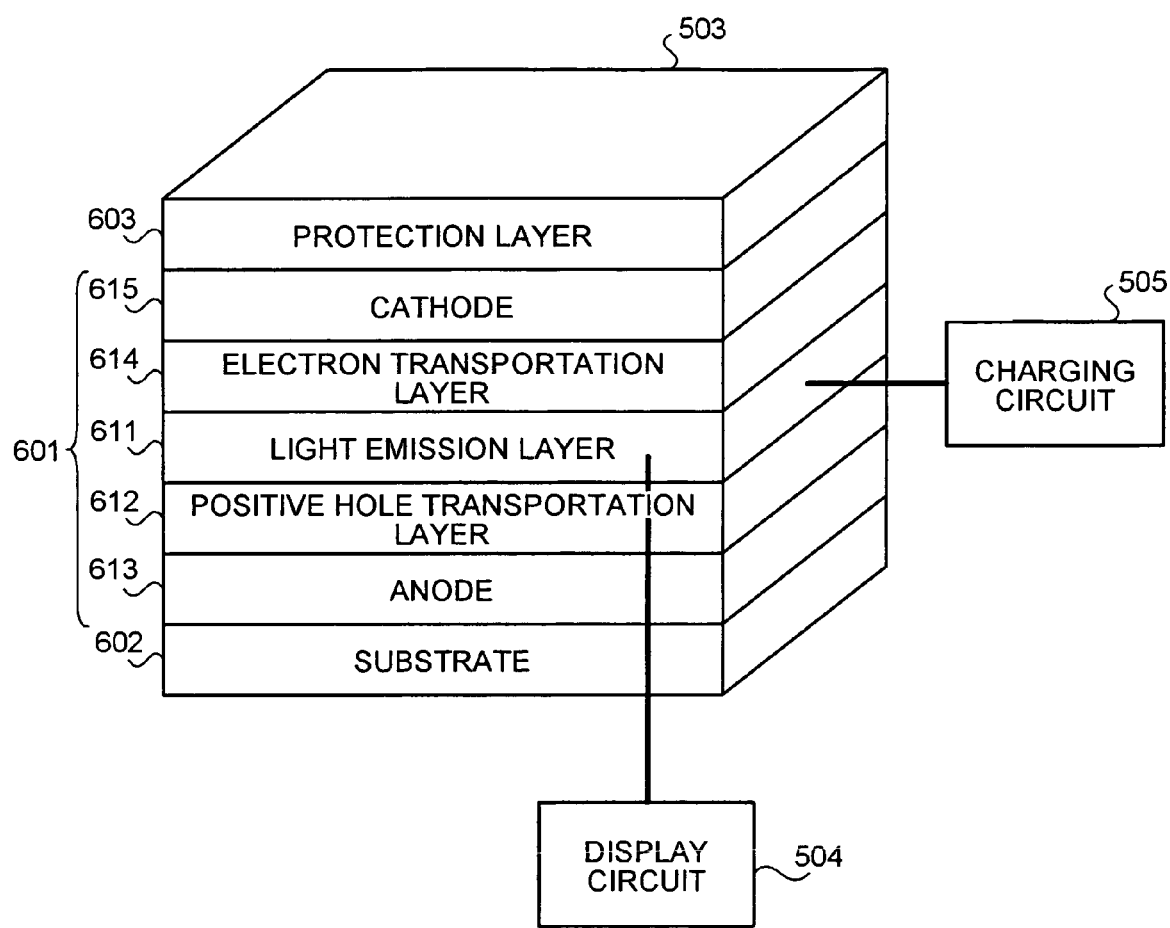

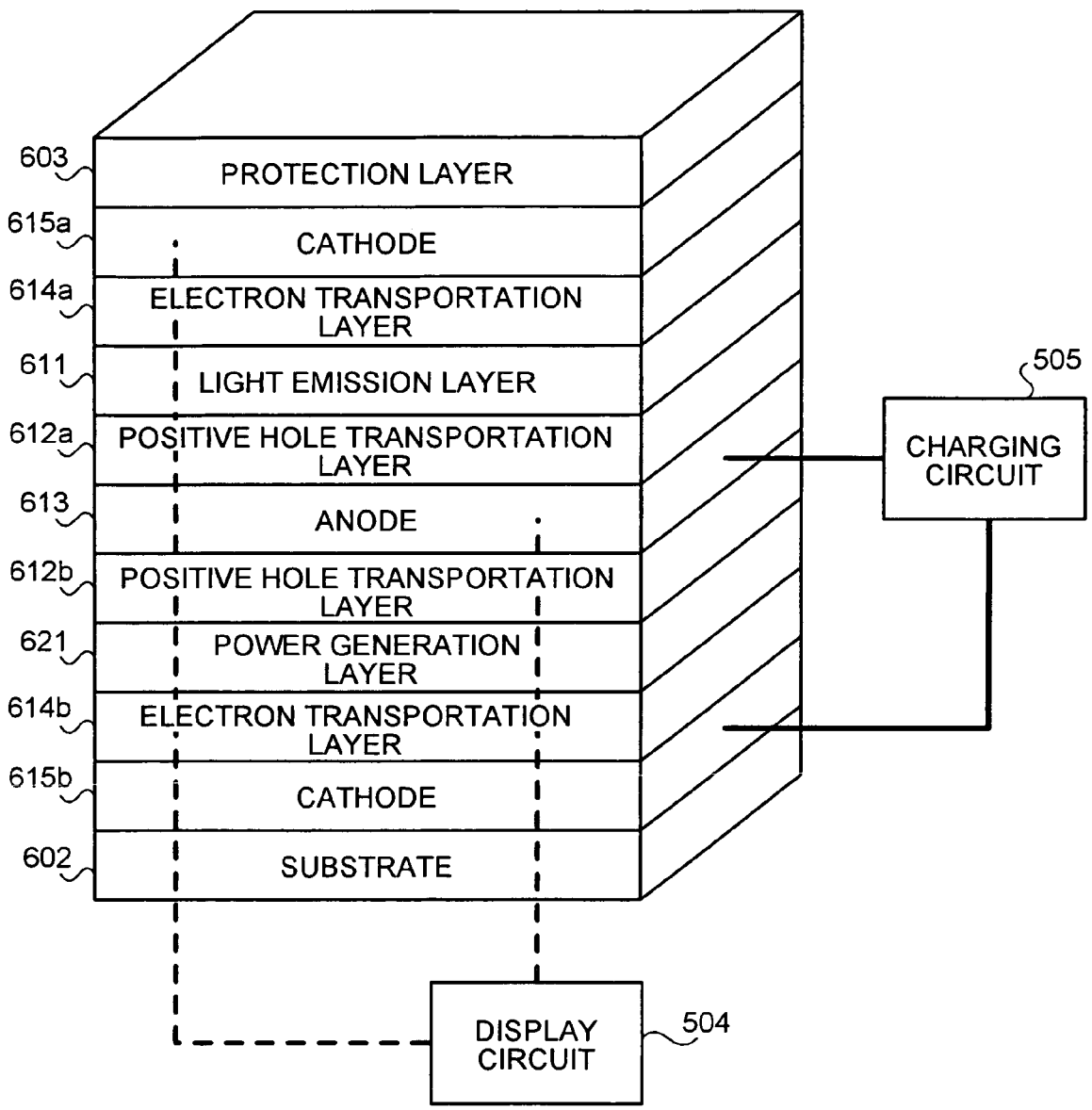

DISPLAY DEVICE, DISPLAY METHOD, AND COMPUTER PRODUCT

BACKGROUND OF THE INVENTION

1. Field of the Invention

The present invention relates to a display device, a display method, and a computer product.

2. Description of the Related Art

Conventionally, two tasks are present regarding heat generation from lighting of an optical source, in a battery-powered compact display device. A first task is reduction in energy loss due to heat generation following lighting of an optical source, and an improvement in efficient utilization of energy by effective use of thermal energy. A second task is realization of an efficient cooling system requiring a reduced space. In order to achieve these tasks, it is known that a display device includes a thermoelectric conversion element having a heat to electricity conversion effect and an electricity to heat conversion effect, a temperature detector that measures and detects a temperature of an optical source or periphery of the optical source, and a thermoelectric conversion element function switch controller that switches a function of the thermoelectric conversion element to either a heat to electricity conversion generation function or an electricity to heat conversion electron cooling function, based on temperature information from the temperature detector. It is disclosed in, for example, Japanese Patent Application Laid-Open (JP-A) No. 2004-361553.

A new type of light emitter that can autonomously emit light is also provided. This light emitter has flexibility, and has a sheet shape. The light emitter includes a layer piezoelectric element that generates electricity, a layer organic electro luminescence (EL) element that is laminated on the piezoelectric element via an insulation layer and emits light, a first protection layer, and a second protection layer. The light emitter also has a waterproof unit that protects the piezoelectric element and the organic EL element from water or moisture, and an electronic circuit that electrically connects between the piezoelectric element and the organic EL element. This light emitter is supported by an adherend. When the piezoelectric element is deformed by the adherend moving or when the piezoelectric element is got vibrations, the piezoelectric element generates electricity. The organic EL element emits light based on electricity generated by the piezoelectric element, as disclosed in, for example, JP-A No. 2002-63801.

An organic EL light emission display device with low power consumption is also provided. This kind of organic EL light emission display device has plural transparent organic EL light emission elements disposed in a pattern on one of the surfaces of a transparent substrate, each transparent organic EL light emission element including a transparent electrode layer, a transparent organic light emitting material layer, and a transparent cathode electrode layer. Solar cells are disposed on the other surface of the transparent substrate. The solar cells and the organic EL light emission elements are electrically connected to each other, as disclosed in, for example, JP-A No. 2002-6769.

According to the conventional technique described in JP-A No. 2004-361553 or No. 2002-6769, a power generation circuit having a power generation function is separately provided on a display panel, for the display device to generate electricity. Therefore, there is a problem that the display device has a larger size than is necessary, which leads to poor portability of the device.

According to the conventional technique described in JP-A No. 2002-63801, the display device incorporates other parts such as the piezoelectric element. Therefore, the number of parts and cost thereof increase. When the display device does not include a power generation function, only a charged cell supplies power to the display device, which limits an operating time of the display device.

SUMMARY OF THE INVENTION

It is an object of the present invention to at least solve the above problems in the conventional technologies.

A display device according to one aspect of the present invention includes a display unit including a display screen; a state detecting unit configured to detect a light emission state of a pixel of the display screen; and a setting unit configured to set the pixel to any one of a display mode and a charge mode based on a result of detection by the state detecting unit.

A display device according to another aspect of the present invention includes a reading unit configured to read image data; a specifying unit configured to specify a pixel to emit light and a pixel not to emit light, from among pixels of a display screen, based on read image data; and a setting unit configured to set the pixel to any one of a display mode and a charge mode based on a result of specification by the specifying unit.

A display method according to still another aspect of the present invention includes detecting a state of a pixel of a display screen in a display device; and setting the pixel to any one of a display mode and a charge mode based on a result of detection at the detecting a state.

A display method according to still another aspect of the present invention includes reading image data; specifying a pixel to emit light and a pixel not to emit light, from among pixels of a display screen, based on read image data; and setting the pixel to any one of a display mode and a charge mode based on a result of specification at the specifying.

A computer-readable recording medium according to still another aspect of the present invention stores therein a computer program for realizing a display method. The computer program makes a computer execute detecting a state of a pixel of a display screen in a display device; and setting the pixel to any one of a display mode and a charge mode based on a result of detection at the detecting a state.

A computer-readable recording medium according to still another aspect of the present invention stores therein a computer program for realizing a display method. The computer program makes a computer execute reading image data; specifying a pixel to emit light and a pixel not to emit light, from among pixels of a display screen, based on read image data; and setting the pixel to any one of a display mode and a charge mode based on a result of specification at the specifying.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 6A is a schematic view of a display panel;

FIG. 6B is a schematic view of an organic EL layer shown in FIG. 6A;

DETAILED DESCRIPTION OF THE PREFERRED EMBODIMENTS

Exemplary embodiments according to the present invention will be explained in detail below with reference to the accompanying drawings.

Figure 1:
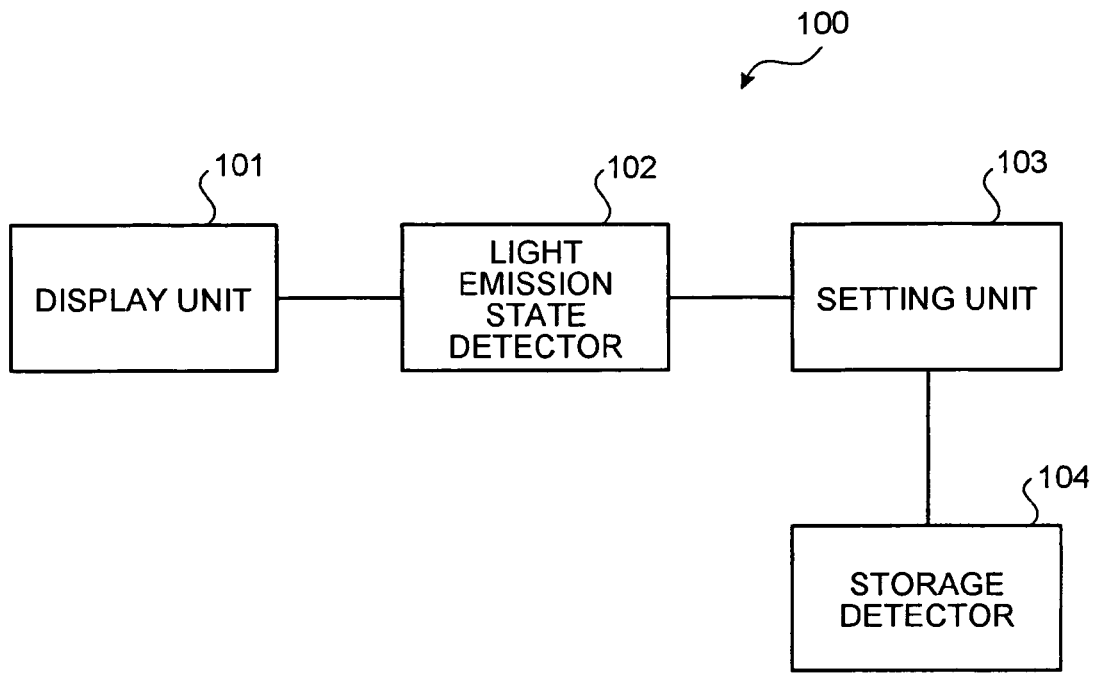
FIG. 1 is a schematic view of a display device according to a first embodiment of the present invention.

FIG. 1 is a schematic view of a display device according to a first embodiment of the present invention. A display device 100 includes a display unit 101, a light emission state detector 102, a setting unit 103, and a storage detector 104.

The display unit 101 has a display screen on which an image (including mere text data such as characters and numerals as well as image data) is displayed. A self-luminous element can be used for the display screen. Specifically, an organic EL element can be used. Each pixel of the display screen has at least two functions. One is a light emission function such as a conventional EL display, and the other is a photoelectronic conversion function that converts a light energy into an electric energy with received sunlight.

The light emission state detector 102 detects a light emission state of pixels of the display screen. The light emission state is a state of light emission from the pixels. A tone of a color of the light-emitting pixel can be also detected. The tone (grayscale or radiation sequence) is expressed as a numerical value of a degree of a change in the color of an image displayed on the display screen. The light emission state of the pixels can be detected based on a voltage applied to the pixels.

The light emission state detector 102 also detects whether the pixels are in the light emission state or a light non-emission state based on image data displayed in the pixels. The image data is recorded in a storage unit, such as a memory (not shown) provided in the display device 100, or a hard disk (HD), an optical disk, or a flash memory provided externally. The light non-emission state is a state when a current does not flow through the pixels of the organic EL element. Specifically, this is the state when pixel data is displayed as black color, for example.

The setting unit 103 sets pixels to either a display mode or a charge mode, based on a result of detection by the light emission state detector 102. The display mode means that a pixel works for light emission pixel for displaying image data by its light emission function. The charge mode means that a pixel works for generating electric power by its photoelectronic conversion function. Charging is performed by photoelectric conversion, for example. The photoelectric conversion refers to conversion of light energy into electric energy. When the light emission state detector 102 detects that the pixels are in the light emission state, the setting unit 103 sets the pixels to the display mode. On the other hand, when the light emission state detector 102 detects that the pixels are in the light non-emission state, the setting unit 103 sets the pixels to the charge mode.

The setting unit 103 sets the pixels to either the display mode or the charge mode, by switching between a display circuit and a charge circuit that are connected to the pixels inside the display device 100. The pixels that are set to the display mode display an image on the display screen.

The pixels that are set to the charge mode receive sunlight or the like, and charge a battery (not shown in the FIG. 1) in the display device 100, using electric energy obtained by photoelectric conversion. The electric energy obtained by the photoelectric conversion can be directly used as a power source of the display device 100 without charging the battery of the display device 100.

The storage detector 104 detects an amount of electricity storage of the display device 100. For example, the storage detector 104 detects a current proportion of storage to a maximum storage capacity (hereinafter, "total storage") of the display device 100.

The setting unit 103 sets the pixels either the display mode or the charge mode, based on storage detected by the storage detector 104. When the storage amount is smaller than a predetermined amount, the setting unit 103 sets a part of the pixels that are set to the display mode, to the charge mode, then the part of the pixels works as the charge mode pixels. By changing the display mode into the charge mode, total power consumption of the display device 100 gets decreasing.

Specifically, when the storage amount becomes smaller than one tenth of the total storage, the setting unit 103 sets a quarter of the total display pixels of the display screen to the charge mode. The pixels that are set to the charge mode are used to perform charging, and the rest of the pixels can be used to display an image. In other words, a display area for displaying the image is forcibly reduced. It means that the pixels in one forth of the original display area work the charge mode for generating electric power with the photoelectric conversion function. The pixels in three forth of the original display area work for the display mode continuously. In this case, the image screen is reduced into three forth size of the original image screen. The rest of the pixels on the display screen (one forth area on the original display area) works for the charge mode such as a solar cell area.

Figure 2:
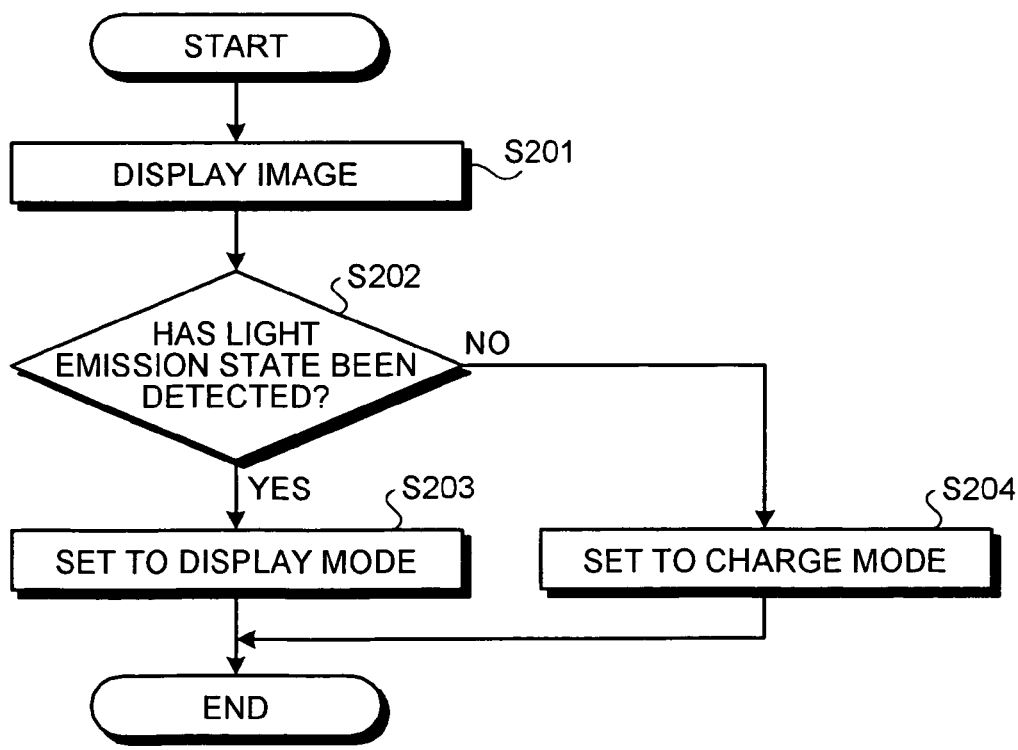
FIG. 2 is a flowchart of a display process performed by the display device according to the first embodiment.

FIG. 2 is a flowchart of a display process performed by the display device according to the first embodiment. At first, the display device 100 displays an image (step S201). Next, the display device 100 determines whether or not the pixel is a light emission state based on image data (step S202). When the light emission state of the pixels is detected (step S202: YES), the display device 100 sets the pixels to the display mode (step S203), then the flowchart ends here. On the other hand, when the light emission state is not detected at step S202 (step S202: NO), the display device 100 sets the pixels to the charge mode (step S204). Thus, the flowchart ends here.

As explained above, according to the first embodiment, the display device detects whether pixels of the display screen are light emitting pixels or non-light emitting pixels, thereby setting the pixels to the display mode or the charge mode. Therefore, even when the display device is being used, the non-light emitting pixels of the display screen can receive light, and charge electricity.

Figure 3:
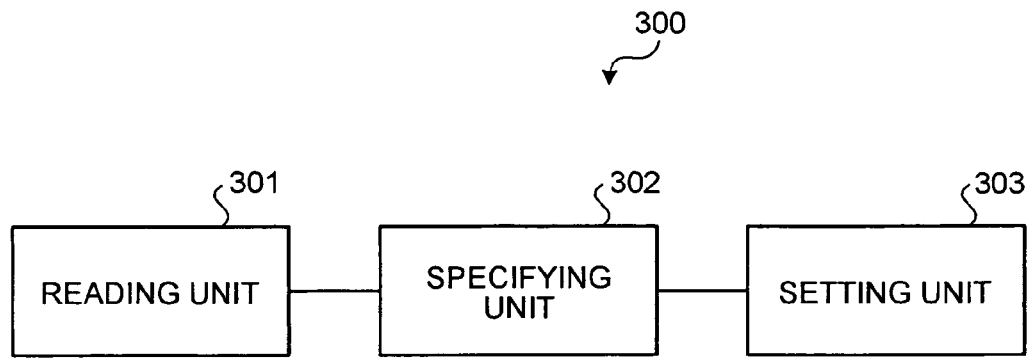
FIG. 3 is a schematic view of a display device according to a second embodiment of the present invention.

In the first embodiment, the light emission state of the pixels is detected after an image is displayed on the display screen. In a second embodiment of the present invention, light emitting pixels and non-light emitting pixels are specified after image data is read and before the image data is displayed on the displace screen. FIG. 3 is a schematic view of a display device according to the second embodiment. A display device 300 includes a reading unit 301, a specifying unit 302, and a setting unit 303.

The reading unit 301 reads image data. The reading unit 301 reads the image data recorded in a storage unit, such as a memory (not shown) provided in the display device 300, or an HD, an optical disc, or flash memory provided externally. Alternatively, a wireless communication device can receive image data, and then the reading unit 301 reads the received image data.

The specifying unit 302 specifies light emitting pixels and non-light emitting pixels, from among the pixels displayed on the display screen, based on the image data read by the reading unit 301. The non-light emitting pixels are a black data part of the read image data (the pixels that display black color data is defined as the non-light emitting pixels). The non-light emitting pixels also include pixels that are not used to display an image because of a small size of the image data. The non-light emitting pixels can be the pixels that locate black data in the image data. The black data means substantially a black color, for example, a dark gray color or a dark purple color, of which color data exceeds a predetermined reference level of pixel data, instead of completely black data. The reason why the pixels for displaying the black color set to the charge mode is that non-emission pixel seems to be black color pixel.

When a current of electricity flown to the pixel data of the organic EL element is set to zero, the pixel data visually appears as black color without emitting light. Therefore, the light emitting pixels or the non-light emitting pixels can be determined based on a current flown to the pixels, instead of the color data of the pixel data.

The setting unit 303 sets pixels to either the display mode or the charge mode, based on a result of a specification by the specifying unit 302. For example, when the specifying unit 302 specifies pixels as the light emitting pixels, the setting unit 303 sets the pixels to the display mode. Data (a voltage or a current) is sent to the pixels that are set to the display mode and the pixels emit light, based on the received data.

When the specifying unit 302 specifies pixels as the non-light emitting pixels, the setting unit 303 sets the pixels to the charge mode. The pixels that are set to the charge mode receive sunlight and the like, and charge a battery device (not shown) in the display device 300, using electric energy obtained by photoelectric conversion. The electric energy obtained by the photoelectric conversion can be directly used as a power source of the display device 300, without charging the display device 300.

Figure 4:
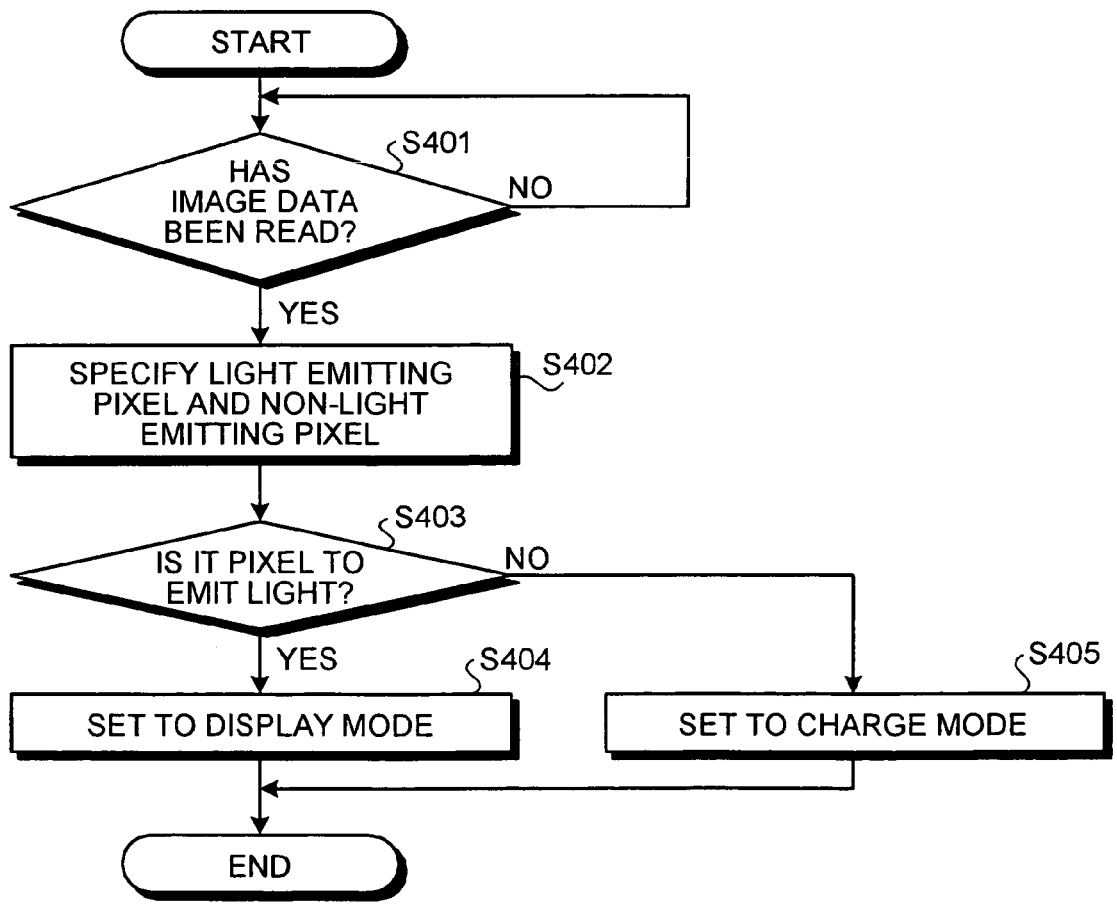
FIG. 4 is a flowchart of a display process performed by the display device according to the second embodiment.

FIG. 4 is a flowchart of a display process performed by the display device according to the second embodiment. The display device 300 determines whether image data has been read (step S401). When the image data has been read (step S401: YES), the display device 300 specifies light emitting pixels and non-light emitting pixels on all of the pixels on the display screen (step S402).

At step S402, the display device 300 determines whether the specified pixels are light emitting pixels based on the image data, current data or voltage data (step S403). When a pixel is light emitting pixel (step S403: YES), the display device 300 sets the pixel to the display mode (step S404), and then the flowchart ends here. On the other hand, when a pixel is non-light emitting pixels at step S403 (step S403: NO), the display device 300 sets the pixel to the charge mode (step S405), and then the flowchart ends here.

As explained above, according to the second embodiment, the display device specifies light emitting pixels and non-light emitting pixels, after reading image data, thereby setting the respective pixels to the display mode and the charge mode. Therefore, even when the display device is displaying an image, the non-light emitting pixels of the display screen works as photoelectronic conversion function pixels, then generate electric power and charge electricity into the battery device by receiving sunlight.

Figure 5:
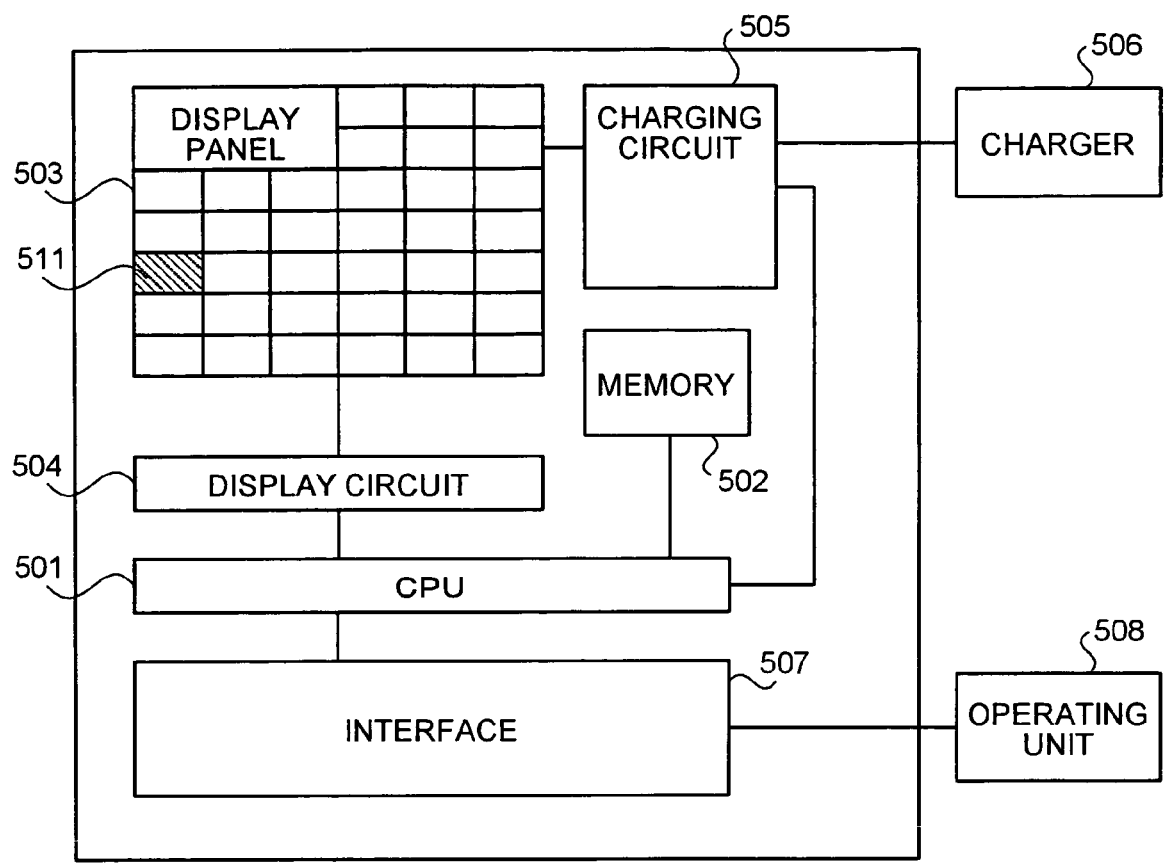
FIG. 5 is a schematic view of a display device 100.

A first example of the display device 100 according to the first embodiment of the present invention is explained below. FIG. 5 illustrates an example of the hardware configuration of the display device 100. The display device 100 includes a central processing unit (CPU) 501, a memory 502, a display panel 503, a display circuit 504, a charging circuit 505, a charger 506, an interface 507, and an operating unit 508.

The CPU 501 controls the entire display device 100. The memory 502 has a function of a read-only memory (ROM) and a random access memory (RAM). The memory 502 stores a boot program, a display program, a sound generation program, and an operating system program. The sound generation program makes the CPU 501 generate tone and sound information corresponding to a pattern. In other words, the sound generation program is used to set a virtual sound source corresponding to the display content of the display device and generate sound guidance information. These pieces of information are output to the interface 507 via the CPU 501.

The display program is for detecting a light emission state of pixels 511 of the display screen on which an image is displayed, and makes the CPU 501 set the pixels 511 to either the display mode of displaying an image or the charge mode of charging the display device based on a photoelectric conversion. The memory 502 is used as a work area of the CPU 501, and functions as an element that stores video data (image information and character information) that is necessary for the display.

The display panel 503 is connected to the display circuit 504 and the charging circuit 505. The display panel 503 displays an image or receives sunlight and the like. When the pixels 511 are connected to the display circuit 504, the pixels emit 511 light based on a voltage of a current transmitted to each pixel 511, thereby displaying an image. When the pixels 511 are connected to the charging circuit 505, the pixels send electric energy obtained by photoelectric conversion to the charger 506, thereby charging the charger 506. A self-luminous element such as an organic EL can be used for the display panel 503.

The interface 507 is connected to the operating unit 508. The operating unit 508 includes a remote controller, a keyboard, and a touch panel with plural keys to input characters, numerical values, and various kinds of instructions, and a mouse.

The interface 507 is connected to a network such as a wireless network or via a communication cable, and can function as the interface 507 between the network and the CPU 501. More concretely, the network includes a local area network (LAN), a wide area network (WAN), a public line network, a portable telephone network, and the like.

The CPU 501 executes the program stored in the memory 502 shown in FIG. 5 to perform the function of the light emission state detector 102, the setting unit 103, and the storage detector 104 shown in FIG. 1, and controls the units 504 to 508 of the display device 100.

FIG. 6A is a schematic view of the display panel. The display panel 503 includes an organic EL layer 601, a substrate 602, and a protection layer 603. The organic EL layer 601 is sandwiched between the substrate 602 and the protection layer 603.

The organic EL layer 601 includes a light emission layer 611, a positive-hole transport layer 612, an anode 613, an electron transport layer 614, and a cathode 615. The anode 613 injects positive-holes to the light emission layer 611, and the cathode 615 injects electrons to the light emission layer 611. The injected positive-holes and the injected electrons are recombined to discharge energy and emit light. The light emission layer 611 can receive light and the light energy create new positive-holes and electrons, then by separating created the positive-holes and electrons, the organic EL layer 601 performs photoelectric conversion, thereby generating electric energy.

The display circuit 504 and the charging circuit 505 are connected to the light emission layer 611. The display circuit 504 and the charging circuit 505 are as explained above so redundant explanation is omitted. The positive-hole transport layer 612 transports the positive holes that are injected from the anode 613 to the light emission layer 611. The electron transport layer 614 transports the electrons that are injected from the cathode 615 to the light emission layer 611.

When a current flows to the organic EL layer 601, electrons collide against positive-holes in the light emission layer 611, thereby generating light. On the other hand, when light enters the organic EL layer 601, electrons and positive-holes are generated in the light emission layer 611 that absorbs the light, thereby extracting a current. Preferably, the organic EL element has a small thickness to improve light emission efficiency, and has a large thickness to improve power generation efficiency. The organic EL layer 601 is designed to maximize these two performances.

As another configuration example of the organic EL layer 601, an organic EL element having the two functions of light emission and power generation can be provided as shown in FIG. 6B. While the light emission layer 611 emits light and generates power in FIG. 6A, the light emission layer 611 and a power generation layer 621 are separated in FIG. 6B. In the configuration shown in FIG. 6B, the display circuit 504 is connected to a cathode 615a and an anode 613. The charging circuit 505 is connected to a cathode 615b and the anode 613.

Light emitting pixels and non-light emitting pixels shown in FIG. 5 are explained. FIGS. 7 to 10 are schematic views of light emitting pixels and non-light emitting pixels. To simplify the explanation, four pixels 511 are assumed herein.

Figure 7:
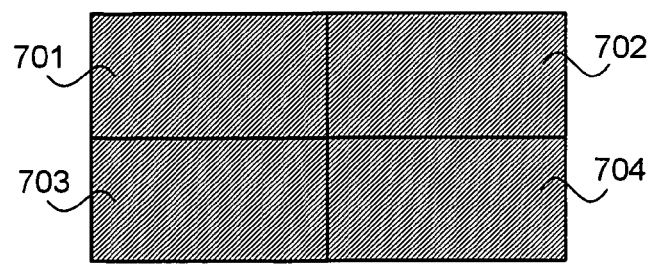
FIG. 7 is a schematic view of light emitting pixels and non-light emitting pixels.

In the example shown in FIG. 7, the four pixels are all non-light emitting pixels. Four pixels 701, 702, 703, and 704 are all set to the charge mode. Each of the pixels 701, 702, 703, and 704 receives light such as sunlight, and charges electricity.

Figure 8:
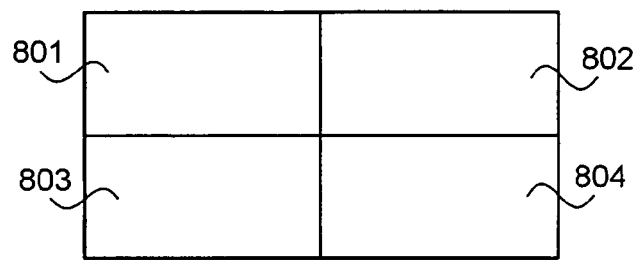
FIG. 8 is a schematic view of light emitting pixels and non-light emitting pixels.

In the example shown in FIG. 8, four pixels 801, 802, 803, and 804 are all light emitting pixels. The four pixels 801, 802, 803, and 804 are all set to the display mode. Each of the pixels 801, 802, 803, and 804 displays an image.

Figure 9:
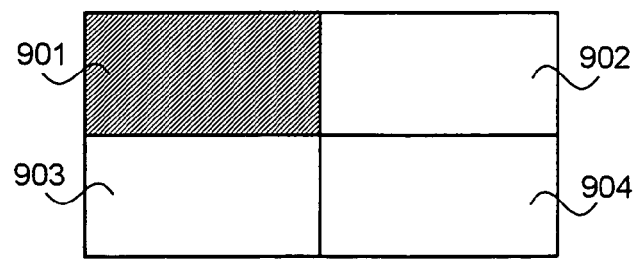
FIG. 9 is a schematic view of light emitting pixels and non-light emitting pixels.

In the example shown in FIG. 9, a pixel 901 is a non-light emitting pixel. On the other hand, pixels 902, 903, and 904 are light emitting pixels. The pixel 901 is set to the charge mode, and the pixels 902, 903, and 904 are set to the display mode. The pixel 901 receives light such as sunlight, and charges electricity. Each of the pixels 902, 903, and 904 displays an image. Therefore, the display device 100 shown in FIG. 9 can be used for a longer time than that shown in FIG. 8.

Figure 10:
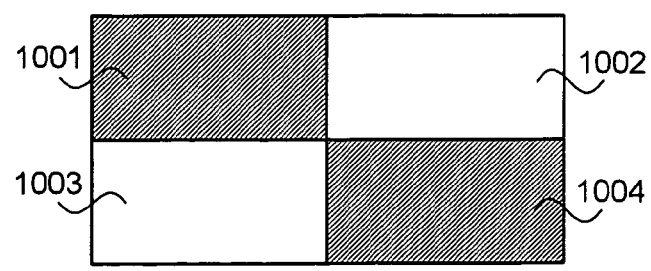
FIG. 10 is a schematic view of light emitting pixels and non-light emitting pixels.

In the example shown in FIG. 10, pixels 1001 and 1004 are non-light emitting pixels. On the other hand, pixels 1002 and 1003 are light emitting pixels. The pixels 1001 and 1004 are set to the charge mode, and the pixels 1002 and 1003 are set to the display mode. The pixels 1001 and 1004 receive light such as sunlight, and charge electricity. The pixels 1002 and 1003 display an image. Therefore, the display device 100 shown in FIG. 10 can be used for a longer time than those shown in FIG. 8 and FIG. 9.

Figure 11:
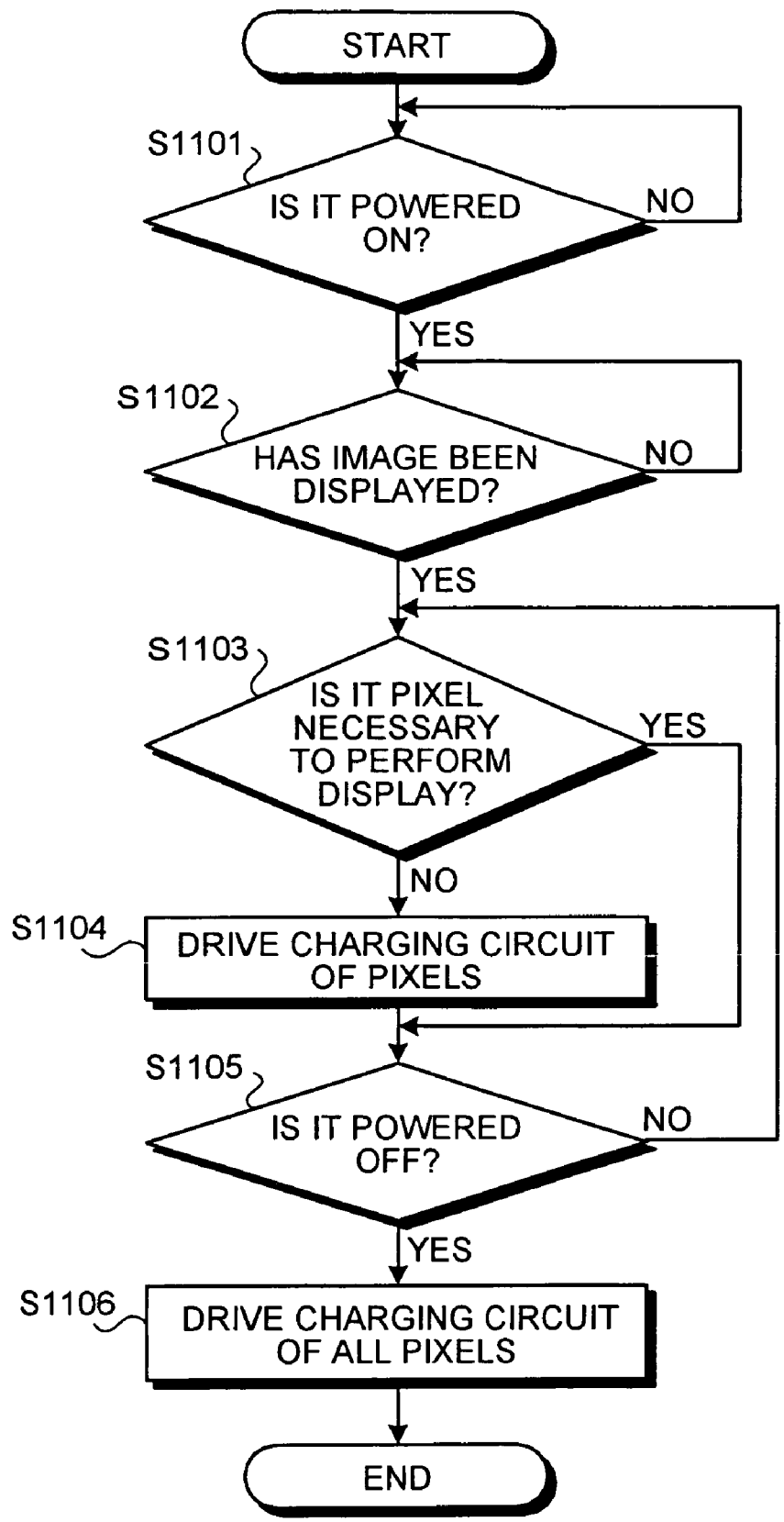
FIG. 11 is a flowchart a display process performed by a display device according to a first example.

FIG. 11 is a flowchart of a display process performed by the display device according to the first example. In the example shown in FIG. 11, it is determined whether the power supply to the display device 100 has been turned on (step S1101). When the power supply to the display device 100 has been turned on (step S1101: YES), it is determined whether a display of an image is instructed (step S1102).

When an image is to be displayed (step S1102: YES), it is determined whether the pixel 511 is necessary to display the image, that is, whether a current for emitting is to be passed (step S1103). For example, it is determined whether the pixel 511 is an area in which an object such as a character and an image is present, or the pixel 511 is a background image area having a single color, or an area in which a charging is forcibly set based on an instruction from an operator or based on an output of the storage detector 104. In other words, the background image area is used as the charge mode pixel to save power consumption, based on the idea that the background image area doesn't have much information for user (if the background image is not displayed, the user does not mind to see the object, especially characters in the whole image. When the pixel 511 is the display mode to display an image, that is, when a current is required to the pixel to emit light (step S1103: YES), the process proceeds to step S1105. On the other hand, when the pixel 511 does not display an image, that is, when the pixel 511 is determined as a background image area or when the pixel 511 is the charge mode to generate current (step S1103: NO), the charging circuit 505 of the pixel 511 is driven (step S1104).

It is determined whether the power supply has been turned off (step S1105). When the power supply has been turned off (step S1105: YES), the charging circuit 505 of all the pixels 511 is driven (step S1106). Then, the flowchart ends. When the CPU 501 determined that the power supply is not off at step S1105 (step S1105: NO), the process proceeds to step S1103, and it is determined whether a current for emitting the pixel 511 is to be passed or not.

With reference to the flowchart of the above first example, if the storage amount of the battery cell (not shown) becomes equal to or lower than a predetermined level during displaying an image on the display screen between the process at step S1101 and step S1104, a part of the pixels 511 of the display screen can be switched to the charge mode to perform generating electric power for charging the battery.

As explained above, according to the first example, it is detected whether the pixel 511 of the display screen is a light emitting pixel 511 or a non-light emitting pixel 511. Then, connection of each pixel 511 can be switched to a display circuit or a charging circuit. Therefore, even when the display device is displaying an image, the non-light emitting pixel 511 of the display screen can receive light and charge electricity.

One example of the display device 300 according to the second embodiment of the present invention is explained next. In the first example, a light emission state of the pixel 511 is detected after an image is displayed on the display screen. In the second example, after image data is read and before the image data is displayed on the display screen, the light emitting pixel 511 and the non-light emitting pixel 511 are specified. Since a hardware configuration of the display device 300 in the second example is similar to that in the first example, explanation thereof is omitted.

Figure 12:
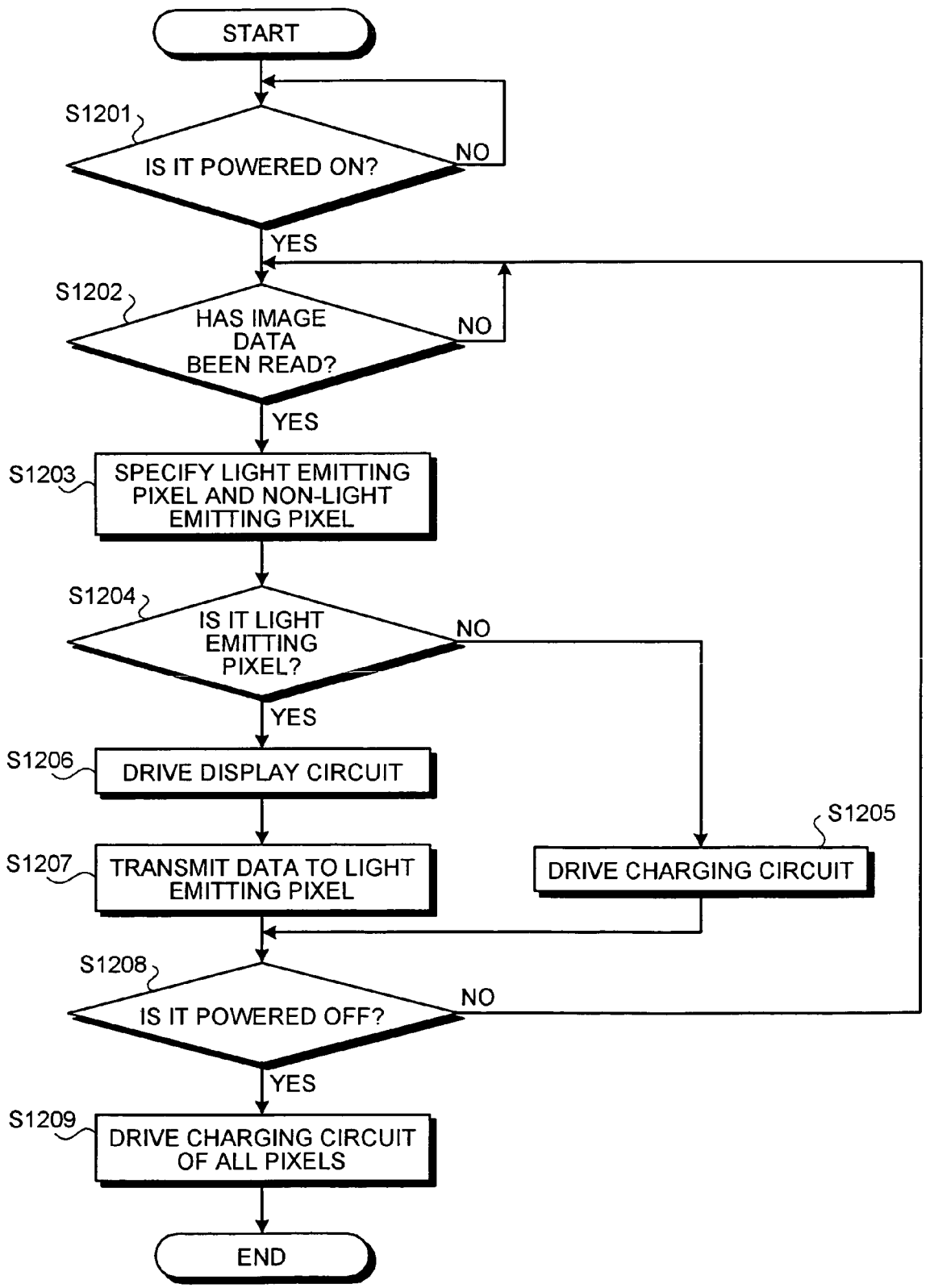
FIG. 12 is a flowchart a display process performed by a display device according to a second example.

FIG. 12 is a flowchart of a display process performed by a display device according to the second example. It is determined whether the power supply to the display device 300 has been turned on (step S1201). When the power supply to the display device 300 has been turned on (step S1201: YES), it is determined whether image data has been read (step S1202).

When image data has been read (step S1202: YES), the light emitting pixel 511 (image data is other than black) and the non-light emitting pixel 511 (image data in black) are specified (step S1203). It is determined whether the pixel 511 specified at step S1203 is to emit light or not (step S1204). When the pixel 511 specified at step S1203 is not used to emit light (step S1204: NO), the charging circuit 505 is driven (step S1205) (the pixel 511 is defined as the charge mode), and the process proceeds to step S1208.

On the other hand, when the pixel 511 specified at step S1203 is to emit light (step S1204: YES), the display circuit 504 is driven (step S1206) (the pixel 511 defined as the display mode). Then, image data is transmitted to the light emitting pixel 511 (step S1207). Next, it is determined whether the power supply has been turned off or not (step S1208). When the power supply has not been turned off (step S1208: NO), the process proceeds to step S1202, and the CPU 501 waits new image data to be loaded. On the other hand, when the power supply has been turned off (step S1208: YES), the charging circuit 505 of all the pixels 511 is driven (step S1209). Thus, this flowchart ends.

As explained above, according to the second example, after image data is read, the light emitting pixel 511 and the non-light emitting pixel 511 are specified. Connection of each pixel 511 can be switched to a display circuit or a charging circuit. Therefore, even when the display device is displaying an image, the non-light emitting pixel 511 of the display screen can receive light and charge electricity. Most display devices display characters in black color. Therefore, pixels that display characters can be used to charge electricity, thereby decreasing a reduction in the storage of the cell.

As explained above, the non-light emitting pixel of the display screen can receive light and charge electricity, even when the display device is displaying an image. Therefore, it is not required to separate the display area and solar cell area of the display screen in the display device. As a result, cost can be decreased. Furthermore, the pixel 511 in the display screen combines the light emitting function and the photoelectronic conversion function, therefore, the power consumption is saved with generated electric power by the charge mode pixel. Consequently, the display device can be made compact, and the portability is improved.

The display method explained in the embodiments can be realized by making a computer, such as a personal computer and a work station, execute a program that is prepared beforehand. The program is stored in a computer-readable recording medium, such as an HD, a flexible disk, a CD-ROM, an MO, a digital versatile disk (DVD), and the like, and is executed by being read from the recording medium by the computer. The program may be a transmission medium that can be distributed via a network such as the Internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2005-302220 filed in Japan on Oct. 17, 2005.

What is claimed is:

1. A display device comprising:
    a display unit including a display screen;
    a state detecting unit which detects a light emission state of a pixel of the display screen;
    an electricity storage unit;
    an electricity capacity detecting unit configured to detect a storage amount of the electricity storage unit; and
    a setting unit which sets the pixel to any one of a display mode and a charge mode based on a result of detection by the state detecting unit or based on the storage amount.

2. The display device according to claim 1, wherein
    the state detecting unit detects whether the pixel is in a light emission state or in a non-light emission state, based on image data.

3. The display device according to claim 2, wherein
    the setting unit sets the pixel to the charge mode when the state detecting unit detects that the pixel is in the non-light emission state.

4. The display device according to claim 2, wherein
    the state detecting unit detects that the pixel is in the non-light emission state when the image data indicates black.

5. The display device according to claim 1, wherein the pixel set to the charge mode generates electric power by photoelectric conversion.

6. The display device according to claim 1, wherein the pixel set to the display mode emits light.

7. A display method comprising:
    detecting a state of a pixel of a display screen in a display device;
    storing electricity;
    detecting a storage amount of the electricity stored at the storing; and
    setting the pixel to any one of a display mode and a charge mode based on a result of detection at the detecting a state or based on the storage amount.

8. The display method according to claim 7, wherein
    the detecting a state includes detecting whether the pixel is in a light emission state or in a non-light emission state, based on image data.

9. The display method according to claim 8, wherein
    the setting includes setting the pixel to the charge mode when it is detected that the pixel is in the non-light emission state at the detecting a state.

10. The display method according to claim 8, wherein
    the detecting a state includes detecting that the pixel is in the non-light emission state when the image data indicates black.

11. A computer-readable recording medium that stores therein a computer program for realizing a display method, the computer program making a computer execute:
    detecting a state of a pixel of a display screen in a display device;
    storing electricity;
    detecting a storage amount of the electricity stored at the storing; and
    setting the pixel to any one of a display mode and a charge mode based on a result of detection at the detecting a state or based on the storage amount.

12. The computer-readable recording medium according to claim 11, wherein
    the detecting a state includes detecting whether the pixel is in a light emission state or in a non-light emission state, based on image data.

13. The computer-readable recording medium according to claim 12, wherein the setting includes setting the pixel to the charge mode when it is detected that the pixel is in the non-light emission state at the detecting a state.

14. The computer-readable recording medium according to claim 12, wherein the detecting a state includes detecting that the pixel is in the non-light emission state when the image data indicates black.

* * * * *